United States Patent [19]

Salmond

[11] Patent Number: 5,032,287

[45] Date of Patent: Jul. 16, 1991

[54] SEPTIC TANK EFFLUENT PROCESSING VAPORIZER

[75] Inventor: Neville A. Salmond, 169 Upper Sturt Road, Upper Sturt, Australia

[73] Assignees: Neville Adrian Salmond, Upper Sturt; Philip John Wotton, Carey Gully, both of Australia

[21] Appl. No.: 410,944

[22] Filed: Sep. 22, 1989

[30] Foreign Application Priority Data

Sep. 26, 1988 [AU] Australia .............................. PJ0592

[51] Int. Cl.[5] ................................................ C02F 9/00

[52] U.S. Cl. .................................... 210/737; 210/138; 210/180; 210/202; 210/258; 210/427; 210/774; 210/916; 261/DIG. 65

[58] Field of Search .................. 405/37; 210/108, 170, 210/180, 202, 205, 206, 258, 260, 737, 791, 104, 136, 411, 532.2, 774, 808, 97, 138, 142, 427, 428, 764, 916; 261/5, DIG. 65

[56] References Cited

U.S. PATENT DOCUMENTS

| | | | |
|---|---|---|---|
| 191,853 | 6/1877 | Hille | 210/916 |
| 1,116,953 | 11/1914 | Testrup | 210/737 |
| 2,432,887 | 12/1947 | Haviland | 405/37 |
| 3,296,122 | 1/1967 | Karassik et al. | 210/774 |
| 3,306,447 | 2/1967 | Medeiros | 210/260 |
| 3,327,855 | 6/1967 | Watson et al. | 210/260 |
| 3,724,664 | 4/1973 | Lemberger et al. | 210/170 |
| 3,864,252 | 2/1975 | Morin et al. | 210/774 |
| 3,977,970 | 8/1976 | Willis et al. | 210/258 |
| 4,601,886 | 7/1986 | Hudgins | 261/DIG. 65 |
| 4,675,116 | 6/1987 | Hoyland | 210/206 |
| 4,698,166 | 10/1987 | Danner et al. | 210/774 |
| 4,704,047 | 11/1987 | Oldfelt et al. | 405/37 |

FOREIGN PATENT DOCUMENTS

| | | | |
|---|---|---|---|
| 2410883 | 9/1975 | Fed. Rep. of Germany | 210/916 |
| 53-97260 | 8/1978 | Japan | 210/916 |
| 60-012116 | 1/1985 | Japan | 210/180 |
| 60-168583 | 9/1985 | Japan | 210/180 |
| 60-248281 | 12/1985 | Japan | 210/180 |
| 61-22590 | 10/1986 | Japan | 210/180 |

*Primary Examiner*—Robert A. Dawson
*Assistant Examiner*—Joseph Drodge
*Attorney, Agent, or Firm*—Gordon L. Peterson

[57] ABSTRACT

An effluent processing arrangement which takes liquid effluent from primary treatment. In a first stage the liquid is filtered. In a second stage the filtrate is treated to neutralize bacterial and other contaminants and then in a third stage is sprayed under pressure into the atmosphere to evaporate it. An air blower can be used to assist evaporation. Provision is made for flocculation of effluent and for backwashing of the filter. The main purpose of the arrangement is for treatment of septic tank effluent.

19 Claims, 2 Drawing Sheets

SEPTIC TANK EFFLUENT PROCESSING VAPORIZER

This invention relates to improvements in the treatment of effluent and particularly domestic effluent by a vapourisation technique.

It has been found that while septic tank type installations are excellent on site household primary sewerage treatment units problems arise with the disposing of the resulting effluent. The major difficulty arises from the fact that water produced from the septic tank cannot be destroyed but must be specifically disposed of. Present systems rely upon surface or subterranean drainage to dispose of water discharged from a septic tank in an unchanged state. As population density grows in particular areas the problems of satisfactory disposing of this unwanted effluent escalates dramatically. Health problems arise for local population through smelling bacterial pathogen and other contamination of the effluent when subterranean drainage is unable to cope with a hydraulic load and surface discharge occurs.

As all discharged effluent eventually becomes a part of the continuing Hydrological cycle of our planet through the effluent entering the normal drainage systems and aquifers, ditches, creeks, streams, rivers, lakes and seas particular problems occur when water catchment areas servicing local populations receive this contaminated water. Instead of the water catchment area providing a relatively clean and safe quantity of water high levels of potentially dangerous contaminates may occur which require considerable treatment and processing before the water involved can be made fit for human consumption.

With an ever increasing population on the planet the problem continues to escalate dramatically.

There are available various systems at present for treatment of the final effluent discharge by the undertaking of secondary processing. Such processing of the effluent is able to improve the quality and reduce the contamination levels of the final discharged water. Problems still occur however with this improved discharge as it makes up a bacterial recolonisation after release and further disposal problems occur during the continued release of this water in extended wet weather periods when hydraulic saturation of the soil occurs. On these occasions the soil is unable to accept any more water and all discharge from every septic tank in the area will end up as polluting surface drainage.

Another problem associated with surface or subterranean discharge of effluent occurs through the various types of soil which must accept the water. In areas where the soil structure provides poor or little drainage it is common to have smelly contaminated water bubbling to the surface under even the best weather conditions thus producing a health risk for the local inhabitants.

To date these problems still occur on a very broad scale around the world and there is an urgent need to substantially improve methods of treating septic tank effluents so that they may be disposed of in a totally non-detrimental way as regards public health and the environment.

Hence it is an object of this invention to overcome these aforementioned problems by providing a processing system which will accept liquid effluent directly from a septic tank and process it to a state of sufficient purity for disposal.

The present invention provides this by converting the effluent into a state of high environmental and health purity before converting the liquid to a vapour state and discharging it into the atmosphere to rejoin the hydrological cycle as a gas and thus shortcutting the current ground polluting liquid state which presently occurs.

In one form therefore the invention may be said to reside in an effluent processing arrangement comprising a holding tank to hold effluent from a source of effluent, a pump to pump effluent from the holding tank and through a filter, at least one treatment tank to receive filtrate from the filter, dosing means to add treatment chemicals to the filtrate in the treatment tank, high pressure pump means to pump treated filtrate from the or each treatment tank to spray means to vapourise the filtrate sprayed from the spray means.

Preferably there may be blower means associated with the spray means to blow air past the spray means to assist with vapourization of the filtrate.

Preferably there are two treatment tanks such that batch treatment of effluent to ensure biological purity in one treatment tank may occur while treated filtrate is being pumped from the other treatment tank to the spray means and while further filtrate is pumped into the other treatment tank.

Preferably there may be provided means to back flush the filter. Such means to back-flush the filter may include a pressure tank to receive filtrate in the normal cycle and to store it under pressure to be recycled back for flushing of the filter as required. Determination of the requirement for back-flushing may be by determining the pressure change across the filter. Hence the means to back-flush the filter may include a branch flow line from a flow line extending between the filter and the treatment tank the branch flow line leading to a pressurised filtrate receiver, further means have been provided in the flow line to periodically direct filtrate from the pressurised filtrate receiver back to the filter and through a waste line to a solids receiving tank.

In an alternative effluent processing arrangement the filtrate may be treated on a continuous basis before being directed to the spray means.

The spray means in one preferred embodiment may comprise lifting jets in a blower housing so that a very fine atomised spray is directed into the atmosphere and with the air being blown around it will vapourise very quickly.

Alternatively where irrigation may be desired the spray means and blower means may be substituted by an irrigation spray and the treated filtrate is then used for irrigation.

To assist with vapourisation of the spray there may be provided a heater to heat the treated filtrate before being sprayed out of the spray means. Such a heater may be electric or solar or a combination of these.

There may also be provided means to add flocculation treatment chemicals to flocculate fine solids in the effluent before filtration.

Hence according to this invention in an alternative form there may be provided an effluent processing arrangement for the treatment of domestic sewerage which has been pretreated in a septic tank, the arrangement comprising a holding tank to hold effluent pumped or drained from the septic tank, a pump to pump effluent along a flow line from the holding tank and through a filter to at least one treatment tank to receive filtrate from the filter, a branch flow line from the flow line between the filter and the treatment tank extending to a pressurised filtrate receiver, dosing means to add treatment chemicals to the filtrate in the treatment tank, high pressure pump means to pump treated filtrate from the or each treatment tank to misting sprays and blower means to blow air past the misting sprays to assist with vapourisation of filtrates sprayed from the misting sprays, valve arrangements being provided in the flow line and valve switching means being provided to periodically direct filtrate from the pressurised filtrate receiver back through the filter to back-flush the filter and to direct solids in the filter through a waste line to the septic tank or to a solids holding tank.

In an alternative form the invention may be said to reside in a method of processing effluent comprising the steps of filtering the effluent, chemically treating the effluent to sterilise and deodorise the effluent with pumping the effluent to spray means into an air stream to vapourise the effluent.

Preferably the filtrate may be heated before pumping it through the spray means.

The processing according to this invention may further include the step of periodically back-flushing the filter.

The step of back-flushing the filter may comprise the steps of directing filtrate from a pressurised filtrate receiver back through the filter to a storage tank.

There may be provided with the apparatus or the method of the present invention a light sensor switch in the control circuit for the apparatus or method to enable to automatic daytime control operation. By operating the system during the day the system may maximise the dispersion efficiency as humidity is lowest during the daytime and highest at night. This also provides the extension of sterilisation efficiency due to the fact that the sun ultraviolet radiation can be utilised to destroy any residual pathogen or microbial organisms.

Continuous automatic operation of this system may be achieved by installing into the various flow lines a number of control items which monitor and control the various functions and cycles of the arrangement. Hydraulic and atmospheric pressure switches may be used to control liquid levels and flow line and coupled with electrically solenoid operated switches and valves along with timer operated switches a totally self-sustaining continuous automatic operation so long as electric power is available ensures that the processing and vapourisation action is continuously available to meet the flow needs from a contributing household or premises.

The arrangement may be such that the system may need to operate for perhaps several hours a day with the holding tank and treatment tank or tanks holding effluent produced during the period of twenty four hours so that the actual spraying and vapourisation may be only necessary perhaps those two hours per day.

Clearly there may be provided a level switch in the holding tank to switch the system on when the level in the holding tank gets to a certain level.

This then generally describes the system but to assist with understanding of the invention reference will now be made to the accompanying drawings which show a preferred embodiment of the invention.

Figure 1:
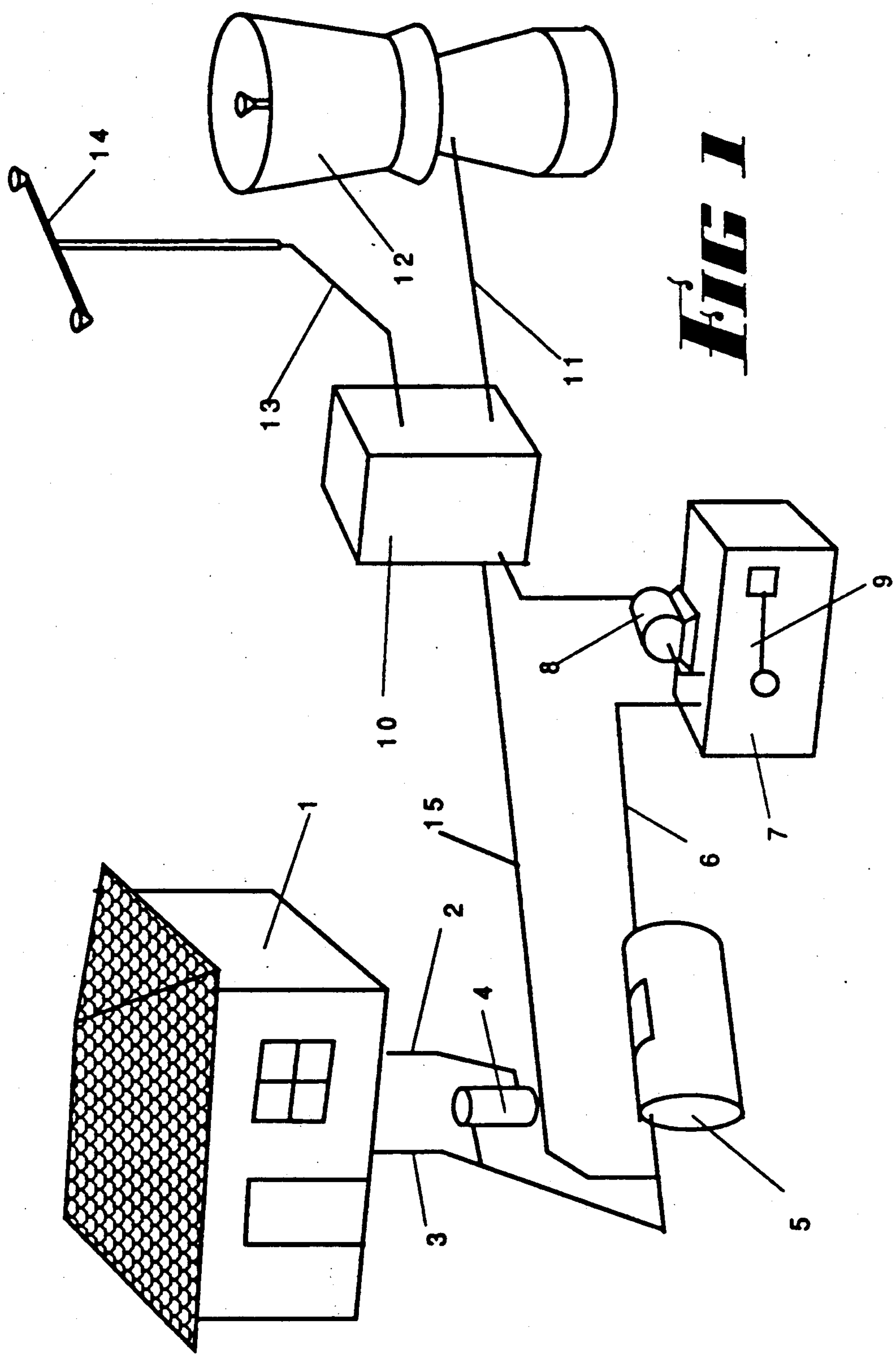
FIG. 1 shows a schematic layout for a domestic effluent treatment system according to this invention.

Now looking more closely at the drawings it will be seen that a house 1 produces waste through a first pipe 2 and a second pipe 3. The waste 2 comes from perhaps a kitchen and hence a grease trap 4 is provided before the line flows into a septic tank 5. Waste from a toilet or bath in line 3 is directed directly to the septic tank. An overflow line 6 from the septic tank 5 is directed to a holding tank 7 as part of the arrangement of the present invention. The holding tank includes a level switch 9 and when the level in the holding tank gets to a certain level and the time of day is suitable for effluent treatment then pump 8 pumps effluent into a treatment arrangement 10 where it is treated as will be discussed later. In one embodiment of the invention effluent after treatment is pumped through line 11 into vapourisor 12 which will be discussed in more detail with respect to FIG. 2. As an alternative the treated effluent may be pumped through line 13 to sprinkler 14. The sprinkler arrangement may be a fixed or movable arrangement suitable for disposing of treated effluent. Flow line 15 is provided to return sludge from the back washing of the filter as will be discussed later to the septic tank 5.

Figure 2:
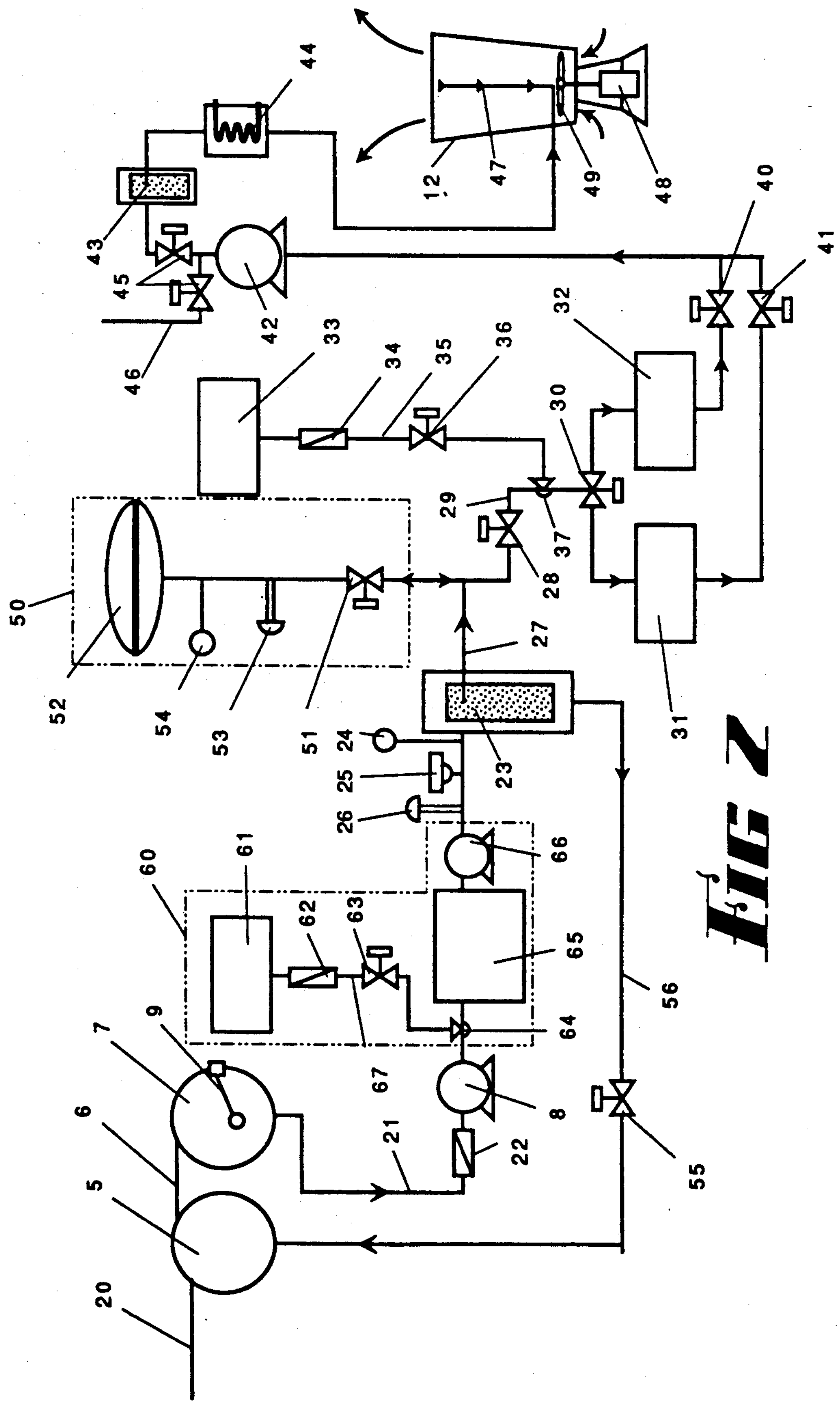
FIG. 2 shows a flow chart for a treatment arrangement according to the present invention.

Now looking at FIG. 2 it will be seen that the septic tank 5 receives effluent through line 20 and the septic tank overflow flows into tank 7, the holding tank for the present invention. A level switch 9 in the holding tank switches on pump 8 when liquid reaches a set level in the holding tank or at a desired time of day and fluid flows through line 21 and through one way valve 22 via pump 8 to filter 23. A pressure gauge 24 pressure regulator 25 and pressure switch 26 are provided to ensure that the back pressure in the filter does not build up too high. In normal treatment filtrate passes out through line 27 from the filter and passes the normally open solenoid valve 28 and line 29 to splitter valve 30 from which it is directed to treatment tank 31 or treatment tank 32.

Treatment chemical is stored in tank 33 and via one way valve 34 flows through line 35 and solenoid valve 36 to a dosing valve 37 on the flow line 29. Hence treatment chemical is injected into the flow line 29 as filtrate is passed into either the treatment tank 31 or treatment tank 32.

As an alternative treatment chemical may be injected directly into one or other treatment tanks as required. Solenoid valves 40 and 41 allow selection of treated filtrate from one treatment tank or the other which is then pumped by means of high pressure pump 42 and through a further carbon filter 43 to an optional heater 44. Solenoid valve 45 allows diversion of the treated filtrate through line 46 to an irrigation arrangement. The irrigation may be into a fixed system or it may be into a movable system. The treated filtrate which passes through the filter 43 and heater 44 passes into a vapouriser 12. The heater 44 may be electrical, gas or solar heating. This vapouriser includes a number of spray jets 47 into which the filtrate is pumped. A motor 48 drives a fan 49 to flow air through the spray generated by the spray jets 47 to encourage vapourisation of the treated filtrate.

The back-flushing of the filter 23 is achieved by means of the optional portion 50. This portion comprises a valve 51 which may be opened to allow filtrate to enter the pressurised filtrate receiver 52. The pressure switch 53 closes the valve 51 when sufficient pressure as indicated on the pressure gauge 54 is stored in the receiver 52. When back-flushing is required the valve 28 is closed and the valve 51 opened and valve 55 is also opened so that sludge and filtrate is directed back through the filter and out through waste line 56 back into the septic tank 5.

As an alternative a replacable filter may be used as the main filter. The pressure switch 26 may indicate when the back pressure on the filter is too high indicating that the filter needs replacing.

There may be provided an optional flocculation treatment arrangement shown in FIG. 2 as 60. This arrangement includes a tank 61 holding flocculation treatment chemicals as required. A dosing line 67 transfers flocculation chemicals via a one way valve 62 and dosing valve 63 to a dosing point 64 in the flow line between the pump 8 and the filter 23. A flocculation tank 65 holds the flocculant treated effluent for a short time to allow reaction to occur and then pump 66 transfers the flocculated effluent to filter 23.

Flocculation will enable finer solids to be removed from the effluent and also with use of suitable treatment chemicals will allow the addition of precipitate forming compounds so that some soluble salts can be removed from the effluent.

It will be seen that by this invention there is provided an arrangement which is suitable for the treatment of effluent particularly septic tank effluent on a domestic scale.

I claim:

1. An efflunet processing arrangement comprising a holding tank to hold effluent from a source of effluent, a filter, a pump means to pump effluent from the holding tank and through the filter, at least one treatment tank means to receive filtrate from the filter, dosing means to add treatment chemicals to the filtrate in the treatment tank means, vaporizing means for converting the filtrate into vapour form, and high pressure pump means to pump treated filtrate from the treatment tank means through the vaporizing means to convert the filtrate into vapour form.

2. An effluent processing arrangement as in claim 1, further including blower means to blow air past the vaporizing means to assist with dispersal of the vapour.

3. An effluent processing arrangement as in claim 2 wherein the treatment tank means comprises two treatment tanks arranged such that batch treatment of effluent in one treatment tank may occur while treated filtrate is being pumped from the other treatment tank.

4. An effluent processing arrangement as in claim 1 further including means to back-flush the filter.

5. An effluent processing arrangement as in claim 4 wherein the means to back-flush the filter includes a pressurized filtrate receiver to receive filtrate and to store it under pressure to be recycled for back-flushing of the filter.

6. An effluent processing arrangement as in claim 4 wherein the means to back-flush the filter includes a branch flow line from a flow line extending between the filter and the treatment tank, the branch flow line leading to a pressurised filtrate receiver, valve switching arrangements being provided in each of the flow lines to periodically direct filtrate from the pressurised filtrate receiver back through the filter and through a waste line to a solids receiving tank.

7. An effluent processing arrangement as in claim 1 wherein the filtrate treatment in the treatment tank means is operable as a continuous process.

8. An effluent processing arrangement as in claim 1 wherein the vaporizing means comprises high pressure vaporizing jets.

9. An effluent processing arrangement as in claim 1, including a heater means is used to heat the treated filtrate upstream of the vaporizing means.

10. An effluent processing arrangement as in claim 1 including control means adapted to operate the high pressure pump means when a level of effluent in the holding tank is above a selected level and during daytime.

11. An effluent treatment arrangement as in claim 1 further including means to add flocculant into the effluent and a flocculation tank means to hold the flocculant treated effluent for a period of time before a further pump transfers it to the filter.

12. An effluent processing arrangement as in claim 1 wherein the treatment tank means comprises two treatment tanks arranged such that batch treatment of effluent in one treatment tank may occur while treated filtrate is being pumped from the other treatment tank.

13. An effluent processing arrangement for the treatment of domestic sewage which has been pretreated in a septic tank, the arrangement comprising a holding tank to hold effluent pumped or drained from the septic tank, a filter for receiving effluent and providing filtrate, at least one treatment tank, a pump means to pump effluent along a flow line from the holding tank and through the filter and to pump the filtrate to the treatment tank, a branch flow line from the flow line between the filter and the treatment tank extending to a pressurised filtrate receiver, dosing means to add treatment chemicals to the filtrate in the treatment tank, high pressure pump means to pump treated filtrate from each treatment tank to vaporizing means, blower means to blow air past the vaporizing means to assist with dispersion of vapour issuing from the vaporizing means, valve means in each of the flow lines for controlling flow in the flow lines and valve switching means for controlling the valve means to periodically direct filtrate from the pressurised filtrate receiver back through the filter to back-flush the filter and to direct solids in the filter through a waste line to the septic tank or to a solids receiving tank.

14. An effluent processing arrangement as in claim 13 further including means to add flocculant into the effluent and a flocculation tank means to hold the flocculant treated effluent for a period of time before a further pump transfers it to the filter.

15. A method of processing sewage effluent comprising the steps of filtering the effluent to provide a filtrate, chemically treating the filtrate to sterilize and deodorize the filtrate and pumping the sterilized and deodorized filtrate through vaporizing means into an air stream to vaporize the sterilized and deodorized filtrate into the atmosphere.

16. A method of processing effluent as in claim 15 further comprising the step of heating the filtrate before pumping it through the vaporizing means.

17. A method of processing effluent as in claim 15 further including the step of periodically back-flushing the filter.

18. A method of processing effluent as in claim 17 wherein the step of periodically back-flushing the filter comprises the step of directing filtrate from a pressurised filtrate receiver back through the filter to a storage tank.

19. A method of processing effluent as in claim 15, wherein the vaporizing means are vaporizing jets.

* * * * *